(12) United States Patent
Yoon et al.

(10) Patent No.: US 11,287,715 B2
(45) Date of Patent: Mar. 29, 2022

(54) AUGMENTED REALITY OPTICAL DEVICE COMPRISING A LIGHT ATTENUATOR THAT CAN REACTIVELY ATTENUATE LIGHT

(71) Applicant: KOREA PHOTONICS TECHNOLOGY INSTITUTE, Gwangju (KR)

(72) Inventors: Seonkyu Yoon, Gwangju (KR); Dongkil Lee, Gwangju (KR); Kwanghoon Lee, Anyang-si (KR)

(*) Notice: Subject to any disclaimer, the term of this patent is extended or adjusted under 35 U.S.C. 154(b) by 204 days.

(21) Appl. No.: 16/560,407

(22) Filed: Sep. 4, 2019

(65) Prior Publication Data

US 2020/0201046 A1 Jun. 25, 2020

(51) Int. Cl.
*G02F 1/137* (2006.01)
*G02B 27/01* (2006.01)

(52) U.S. Cl.
CPC ..... *G02F 1/13725* (2013.01); *G02B 27/0172* (2013.01); *G02B 2027/014* (2013.01); *G02B 2027/0118* (2013.01); *G02F 2203/48* (2013.01)

(58) Field of Classification Search
CPC ............ G02F 1/13725; G02F 2203/48; G02F 1/13475; G02B 2027/015; G02B 27/0081
See application file for complete search history.

(56) References Cited

U.S. PATENT DOCUMENTS

| | | | |
|---|---|---|---|
| 9,569,896 B2* | 2/2017 | Seen | G06T 19/006 |
| 9,898,995 B2* | 2/2018 | Kim | G02B 27/0172 |
| 2010/0254017 A1* | 10/2010 | Martins | G02B 7/002 |
| | | | 359/631 |
| 2010/0257252 A1* | 10/2010 | Dougherty | G06K 9/00671 |
| | | | 709/217 |
| 2011/0018903 A1* | 1/2011 | Lapstun | G06F 3/011 |
| | | | 345/633 |
| 2011/0214082 A1* | 9/2011 | Osterhout | G06F 1/1673 |
| | | | 715/773 |
| 2013/0163090 A1* | 6/2013 | Yu | A63F 13/213 |
| | | | 359/630 |
| 2016/0278695 A1* | 9/2016 | Wang | G02B 23/2461 |
| 2017/0276960 A1* | 9/2017 | Osterman | G02F 1/13363 |

FOREIGN PATENT DOCUMENTS

| | | |
|---|---|---|
| KR | 10-2015-0057183 | 5/2015 |
| KR | 10-2015-0131577 | 11/2015 |

OTHER PUBLICATIONS

English Specification of 10-2015-0057183.
English Specification of 10-2015-0131577.

* cited by examiner

*Primary Examiner* — Paul C Lee
(74) *Attorney, Agent, or Firm* — Antonio Ha & U.S. Patent, LLC (57) ABSTRACT

An augmented reality (AR) optical device comprises an AR optical system configured to generate an AR image and lay the AR image over an actual environment image perceived by a user and a light attenuator disposed in a direction along which the AR optical system is optically exposed to an actual environment and configured to attenuate a brightness of the actual environment image.

4 Claims, 15 Drawing Sheets

AUGMENTED REALITY OPTICAL DEVICE COMPRISING A LIGHT ATTENUATOR THAT CAN REACTIVELY ATTENUATE LIGHT

CROSS-REFERENCE TO RELATED APPLICATION(S)

This application is based on and claims priority under 35 U.S.C. 119 to Korean Patent Application No. 10-2018-0165184, filed on Dec. 19, 2018, in the Korean Intellectual Property Office, the disclosure of which is herein incorporated by reference in its entirety.

TECHNICAL FIELD

Embodiments of the disclosure relate to devices and methods for reactively attenuating light.

DESCRIPTION OF RELATED ART

The description of the Discussion of Related Art section merely provides information that may be relevant to embodiments of the disclosure but should not be appreciated as necessarily constituting the prior art.

Head mounted displays (HMDs), a sort of wearable devices worn on the user's head, like glasses, to receive multimedia content, have been designed to display images from an image source positioned adjacent the user' eyes on a virtual large screen a little far away from the user's eyes.

HMDs commonly come in two types: see-closed and see-through. The see-closed HMDs are able to obtain images only with the external view blocked, and the see-through HMDs can obtain images while securing the external view.

With augmented reality (AR) technology growing, more popularity is gained by see-through HMDS which lay and display AR images over the external view.

Such conventional HMDs, however, suffer from the following shortcomings. The need for securing the external view requires a portion to be exposed to the external environment so as to get light in from the outside. Thus, inconvenience arises in outdoor use especially under strong sunshine. Adjusting up the brightness of images may address this issue but may significantly consume battery and negatively affect the user's vision.

Further, HMDs optimized for outdoor use may cause inconvenience in indoor use.

Thus, a need exists for an optical system that may be adopted in HMDs to allow the HMDs to be used both indoors and outdoors free from the above-mentioned issues.

SUMMARY

According to an embodiment of the disclosure, there is provided a reactive light attenuating device and method to sense the brightness of an actual environment image where augmented information is displayed and photo-reactively attenuate the brightness of the actual environment image to allow the augmented information to clearly be observed selectively in the whole or part of an information display area.

According to an embodiment of the disclosure, there is provided an AR optical device with a reactive light attenuator, which may smoothly be operated in both indoor and outdoor use.

According to an embodiment of the disclosure, an augmented reality (AR) optical device comprises an AR optical system configured to generate an AR image and lay the AR image over an actual environment image perceived by a user and a light attenuator disposed in a direction along which the AR optical system is optically exposed to an actual environment and configured to attenuate a brightness of the actual environment image.

The light attenuator may be an optical element configured to partially and selectively attenuate light.

The light attenuator may be formed of a guest-host liquid crystal.

The light attenuator may be configured to increase light attenuation when the brightness of the actual environment image increases.

According to an embodiment of the disclosure, a reactive light attenuating device to attenuate a brightness of an actual environment image perceived by a user, for an AR optical device configured to lay an AR image over the actual environment image comprises a light attenuator disposed in a direction along which the AR optical system is optically exposed to an actual environment and configured to attenuate a brightness of the actual environment image.

The light attenuator may be an optical element configured to partially and selectively attenuate light.

The light attenuator may be formed of a guest-host liquid crystal.

The light attenuator may be configured to increase light attenuation when the brightness of the actual environment image increases.

According to an embodiment of the disclosure, a reactive light attenuating method to attenuate a brightness of an actual environment image perceived by a user, for an AR optical device to lay an AR image over the actual environment image comprises disposing a light attenuator in a direction along which an AR optical system is optically exposed to an actual environment and attenuating a brightness of the actual environment image using the light attenuator.

Attenuating the brightness may include partially and selectively attenuating light.

Attenuating the brightness may include increasing light attenuation when the brightness of the actual environment image increases.

As described above, according to the embodiments of the disclosure, a reactive light attenuator may be included in or attached to an optical device and photo-reactively attenuate light observed by the optical device, thereby enabling the outputting of images or videos represented in the optical device in a constant brightness regardless of use environments.

As the reactive light attenuator 120 is included in or attached to the optical device, AR videos or images may smoothly be provided to the user both indoors and outdoors.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Various changes may be made to the disclosure, and the disclosure may come with a diversity of embodiments. Some embodiments of the disclosure are shown and described in connection with the drawings. However, it should be appreciated that the disclosure is not limited to the embodiments, and all changes and/or equivalents or replacements thereto also belong to the scope of the disclosure. Similar reference denotations are used to refer to similar elements throughout the drawings.

The terms "first" and "second" may be used to describe various components, but the components should not be limited by the terms. The terms are used only to distinguish one component from another. For example, a first component may be denoted a second component, and vice versa without departing from the scope of the disclosure. The term "and/or" may denote a combination(s) of a plurality of related items as listed or any of the items.

When a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween.

The terms as used herein are provided merely to describe some embodiments thereof, but not to limit the disclosure. It is to be understood that the singular forms "a," "an," and "the" include plural references unless the context clearly dictates otherwise. As used herein, the term "comprise," "include," or "have" should be appreciated not to preclude the presence or addability of features, numbers, steps, operations, components, parts, or combinations thereof as set forth herein.

Unless otherwise defined, all terms including technical and scientific terms used herein have the same meaning as commonly understood by one of ordinary skill in the art to which the embodiments of the disclosure belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The components, processes, steps, or methods according to embodiments of the disclosure may be shared as long as they do not technically conflict with each other.

Figure 1:
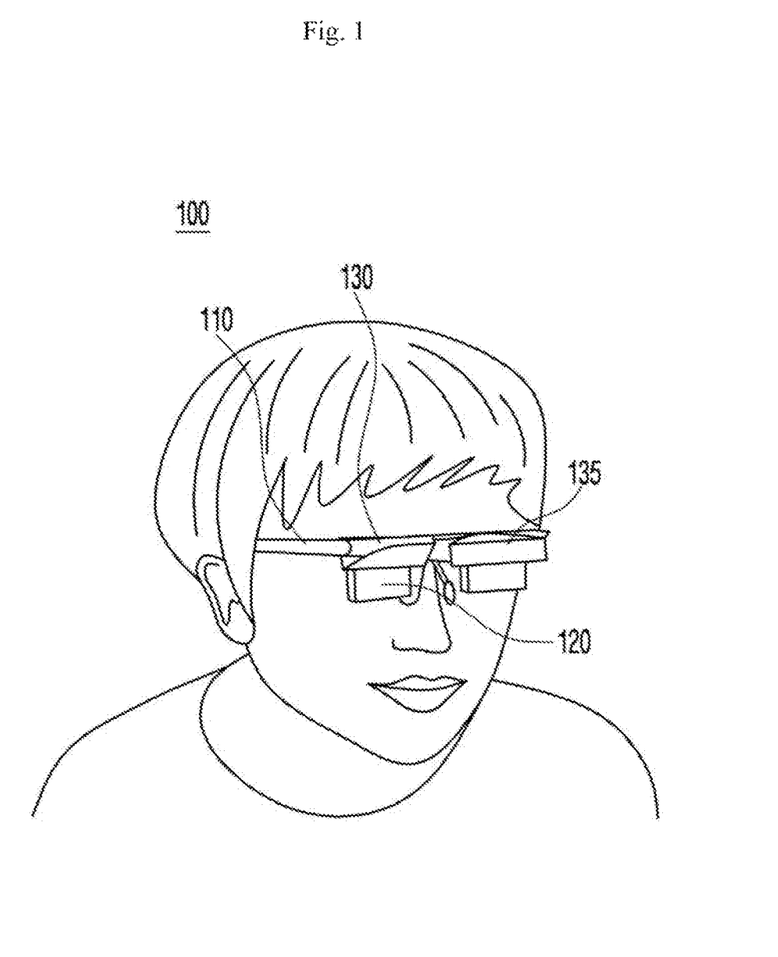
FIG. 1 is a perspective view illustrating an augmented reality (AR) optical device according to an embodiment of the disclosure.
Figure 2:
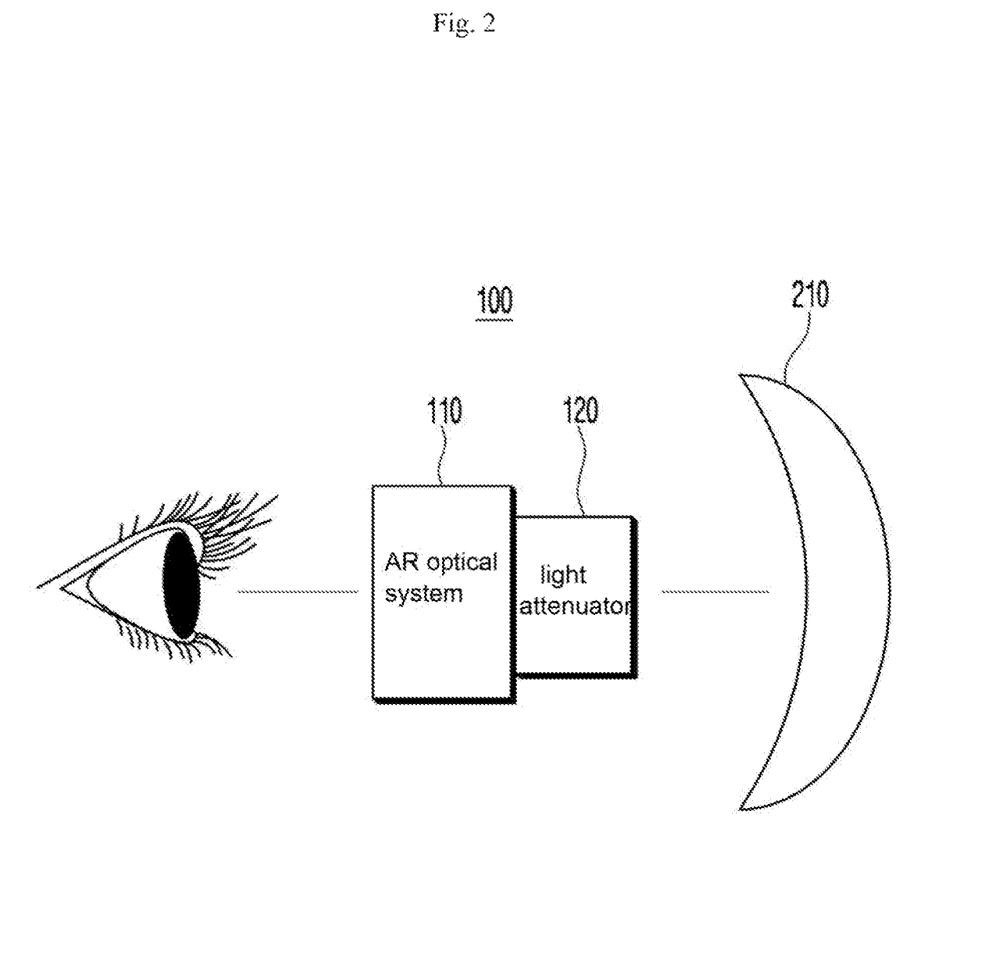
FIGS. 2 and 3 are block diagrams illustrating an AR optical device according to an embodiment of the disclosure.
Figure 3:
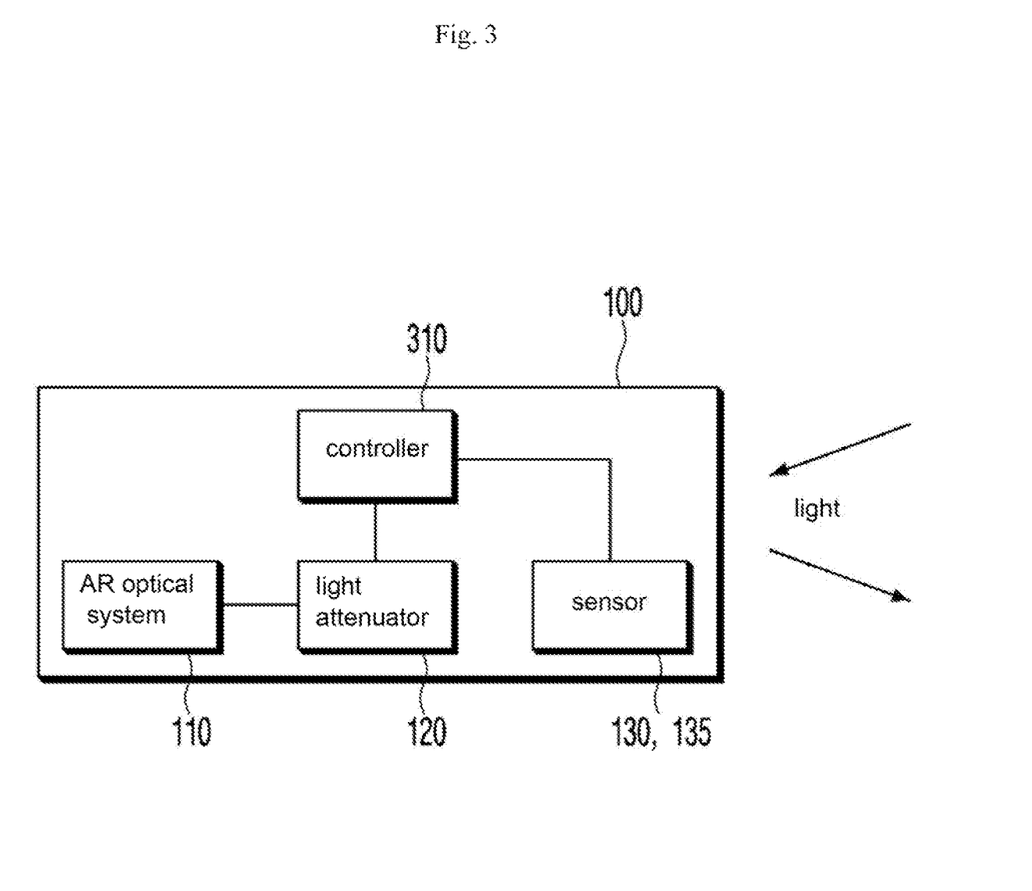

FIG. 1 is a perspective view illustrating an AR optical device according to an embodiment of the disclosure. FIGS. 2 and 3 are block diagrams illustrating an AR optical device according to an embodiment of the disclosure.

Referring to FIGS. 1 to 3, according to an embodiment of the disclosure, an augmented reality (AR) optical device 100 includes an AR optical system 110, a light attenuator 120, sensors 130 and 135, and a controller 310. Although FIG. 1 illustrates that the AR optical device 100 is a head mounted display (HMD), embodiments of the disclosure are not limited thereto, but may rather be implemented as any other device capable of implementing AR images or videos.

The AR optical system 110 is a device to produce and output a video or image, which is virtual information useful for implementing augmented reality.

The AR optical system 110 may include an image output unit (not shown) to produce an AR video or image which is to be overlaid on an actual environment image 210 and may output the AR video or image to the user of the AR optical device 100. The AR optical system 110 includes an optical device, e.g., a lens, mirror, or beam splitter, to control the focal length of the AR video or image to be output to the user and adjust the overall size of the AR optical system 110. The AR optical system 110 may be overall resized using the optical device and output the AR video or image in an adequate position. Various example configurations of the AR optical system 110 are shown in FIGS. 4 to 12.

The AR optical system 110 has one surface or part where an actual environment image 210 is optically observed. Since the AR optical system 110 lays the AR video or image over the actual environment image 210 and outputs the same to implement augmented reality, one surface or part of the AR optical system 110 needs to be exposed to the actual environment image 210. The user may view the AR video or image overlaid on the exposed actual environment image 210.

The light attenuator 120 is a device to attenuate the brightness of the actual environment image observed from the AR optical system 110.

The light attenuator 120 is disposed in the direction in which the AR optical system 110 is exposed to the actual environment image 210. For example, the light attenuator 120 may be disposed between the AR optical system 110 and the actual environment image 210. For more efficiency, the light attenuator 120 may be attached on the part of the AR optical system 110 which is exposed to the actual environment image 210. The light attenuator 120 is so disposed or attached and attenuates the brightness of the actual environment image 210 observed from the AR optical system 110.

The light attenuator 120 may be photo-reactively operated to determine a light attenuation rate depending on the brightness of the actual environment image 210 observed. Where the brightness of the actual environment image 210 observed from the AR optical system 110 increases, the light attenuator 120 increases the light attenuation to enable observation of augmented information displayed inside the AR optical system 110. In contrast, as the brightness of the actual environment image observed from the AR optical system 110 decreases, the light attenuator 120 reduces the light attenuation.

The light attenuator 120 may control the light attenuation rate under the control of the controller 310. Where the use environment of the AR optical device 100 gradually varies over time, the light attenuator 120 may perform the above-described photo-reactive operations. However, when the use environment of the AR optical device 100 drastically changes, e.g., when the AR optical device 100 having been used inside a room moves to the outside or vice versa, the light attenuator 120 may not perform the photo-reactive operations nor does it respond to such a sudden environmental change. To address such issue, the light attenuator 120 may be fed power from the outside to vary the light attenuation rate. The light attenuator 120 may include electrodes for receiving power from the outside. The light attenuator 120 may receive power from the controller 310. The light attenuation rate of the light attenuator 120 may be varied depending on the amount of power received. Where the AR optical device 100 being used indoors moves to the outside, the light attenuator 120 increases the light attenuation under the control of the controller 310 to thereby reduce the amount of light incident to the AR optical system 110. Where the AR optical device 100 being used outdoors moves to the inside, the light attenuator 120 decreases the light attenuation under the control of the controller 310 to thereby increase the amount of light incident to the AR optical system 110. As such, the light attenuator 120 may attenuate incident light by the photo-reactive operation on its own or under the control of the controller 310.

To perform the above-described operations, the light attenuator 120 may be implemented as an optical device or element capable of selective photo attenuation of a part of information display surface, e.g., guest host liquid crystal. As an example, as the light attenuator 120 may be formed of guest host liquid crystal, the light attenuator 120 may actively react to light to attenuate incident light, or the photo attenuation may be controlled by the power applied to the electrodes of the light attenuator 120. However, embodiments of the disclosure are not limited thereto but any other material may be used for the light attenuator 120 as long as the material is actively photo-reactive and its light attenuation rate is controlled by power applied thereto.

The sensors 130 and 135 sense the use environment of the AR optical device 100.

The sensors 130 and 135 may be implemented as optical sensors capable of sensing the brightness of an actual environment image observed from the outside by the AR optical device 100. Light has energy. Thus, where there is light radiation is relatively hotter than where there is no light radiation. The sensors 130 and 135 may be implemented as temperature sensors capable of sensing the temperature of the outside of the AR optical device 100 by such nature. One or both of the sensors 130 and 135 may be an imaging sensor, optical sensor, or temperature sensor.

The controller 310 controls the operation of the light attenuator 120.

The controller 310 receives values sensed by the sensors 130 and 135 and controls the operation of the light attenuator 120 according to the sensing values. The controller 310 receives sensing values from the sensors 130 and 135 and analyzes the received sensing values to grasp what the use environment of the AR optical device 100 is like and how the use environment is changed. The controller 310 controls the light attenuator 120 depending on the result grasped. The controller 310 controls the light attenuation rate of the light attenuator 120 by applying power to the electrodes of the light attenuator 120. For example, the controller 310 may analyze the sensing values and control the light attenuator 120 so that the ratio of the brightness of the AR video or image output from the AR optical device 100 to the brightness of the actual environment image remains 1:1. As the controller 310 maintains the brightness ratio as 1:1, the user may view the AR video or image always in the optimal environment although the external environment changes.

Upon identifying that the external environment of the AR optical device 100 is nighttime using the sensing values (e.g., when the temperature or amount of light sensed is lower than a reference value), the controller 310 may increase the light attenuation rate of the light attenuator 120. To prevent light inside the AR optical device 100 from leakage to the outside, the controller 310 may increase the light attenuation rate of the light attenuator 120 at nighttime.

Figure 15A:
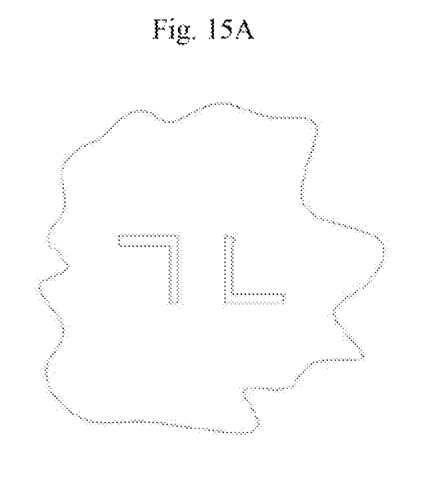
FIG. 15A is a view illustrating an image, which is subjected to brightness attenuation by an AR optical device according to an embodiment of the disclosure.
Figure 15B:
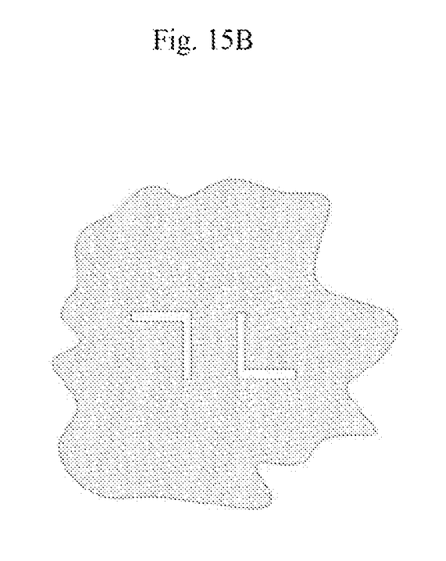
FIG. 15B is a view illustrating an image, which is not subjected to brightness attenuation by an AR optical device according to an embodiment of the disclosure.

FIGS. 15A and 15B illustrate an image which is subjected to brightness attenuation and another image which is not, according to the operation of the AR optical device 100.

FIG. 15A is a view illustrating an image, which is subjected to brightness attenuation by an AR optical device according to an embodiment of the disclosure. FIG. 15B is a view illustrating an image, which is not subjected to brightness attenuation by an AR optical device according to an embodiment of the disclosure.

Referring to FIG. 15A, the actual environment image 210 observed from the AR optical system 110 is too high in brightness to clearly observe the AR image 410.

In this case, the light attenuator 120 allows the AR image 410 to be clearly observed by increasing the light attenuation so that the augmented information displayed inside the AR optical system 110 is observed as shown in FIG. 15B.

FIGS. 4, 5, 6, 7, 8, 9, 10, 11, and 12 are views illustrating example configurations of an AR optical device according to an embodiment of the disclosure.

The AR optical system 110 may be implemented in various forms depending on the optical devices or elements it includes.

Figure 4:
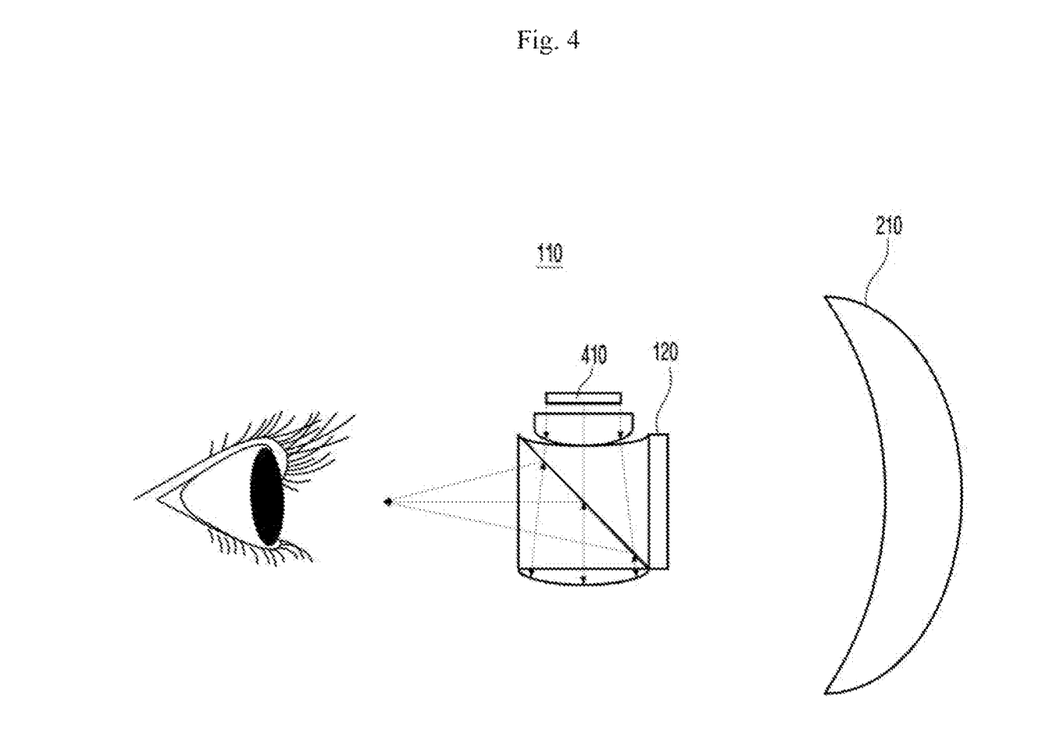
FIGS. 4, 5, 6, 7, 8, 9, 10, 11, and 12 are views illustrating example configurations of an AR optical device according to an embodiment of the disclosure.

As shown in FIG. 4, the AR optical system 110 may provide the user with an AR video or image, which is output from an image output unit 410 disposed at the top of the AR optical system 110, using a beam splitter.

Figure 5:
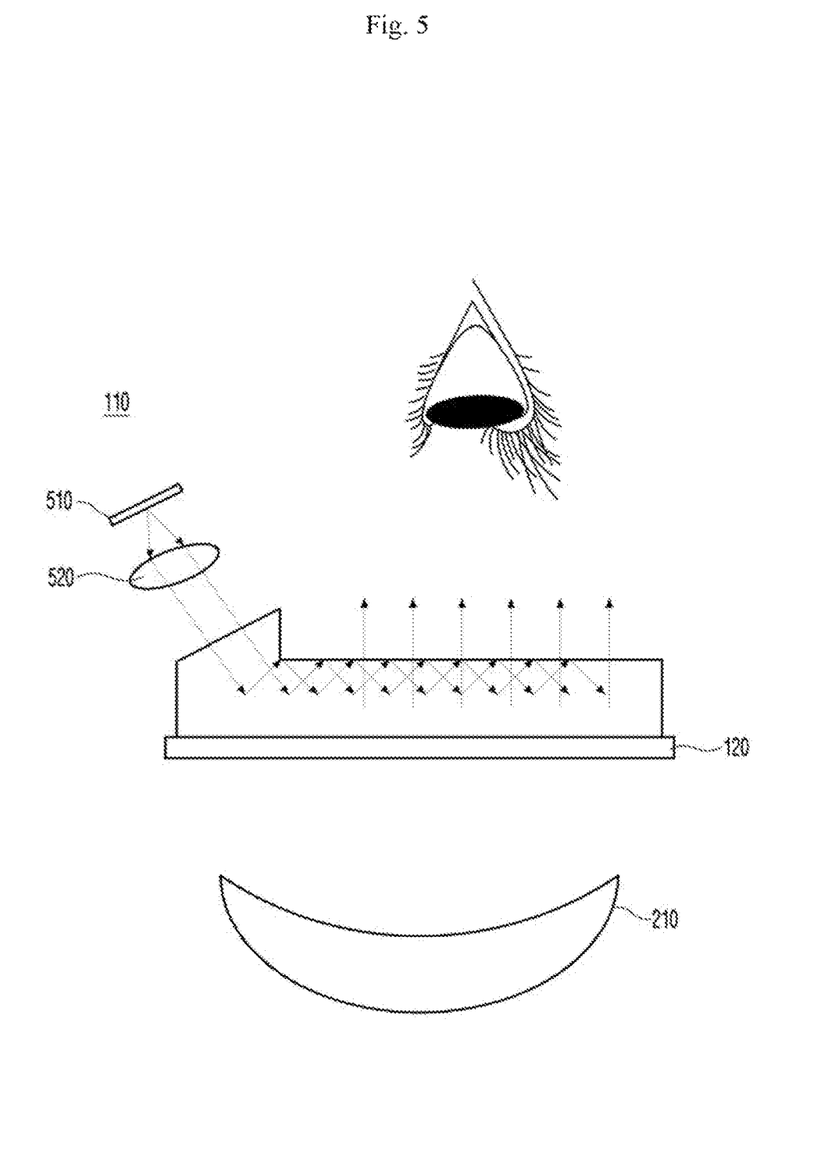
Figure 10:
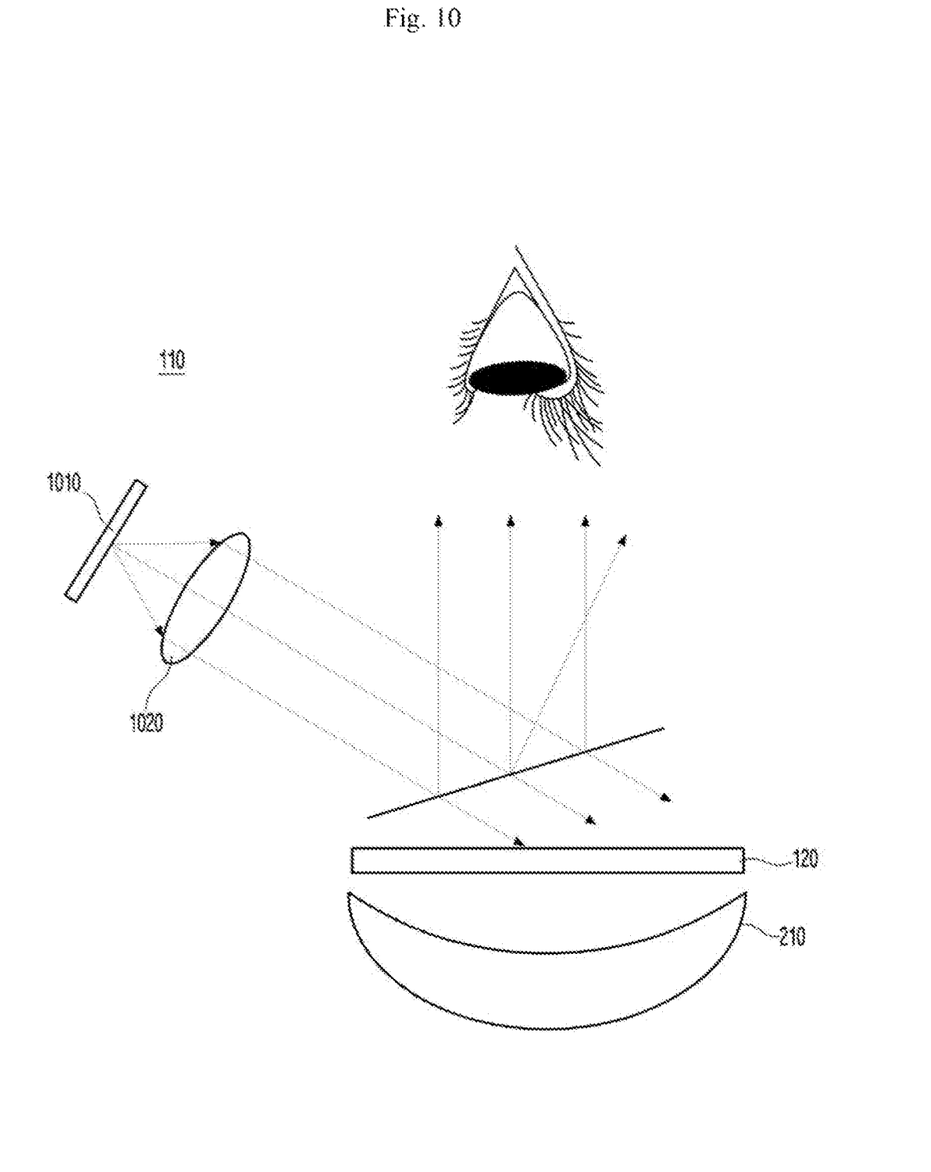
Figure 11:
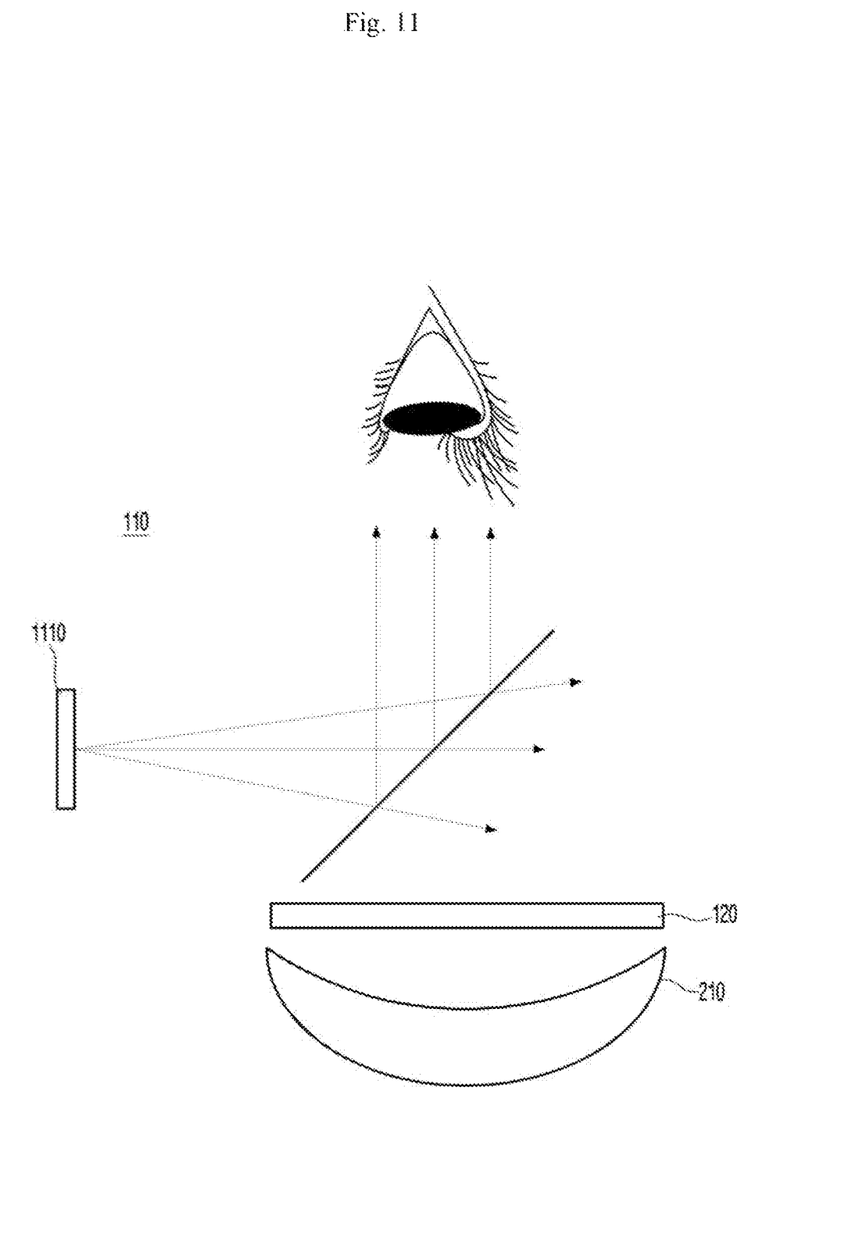
Figure 12:
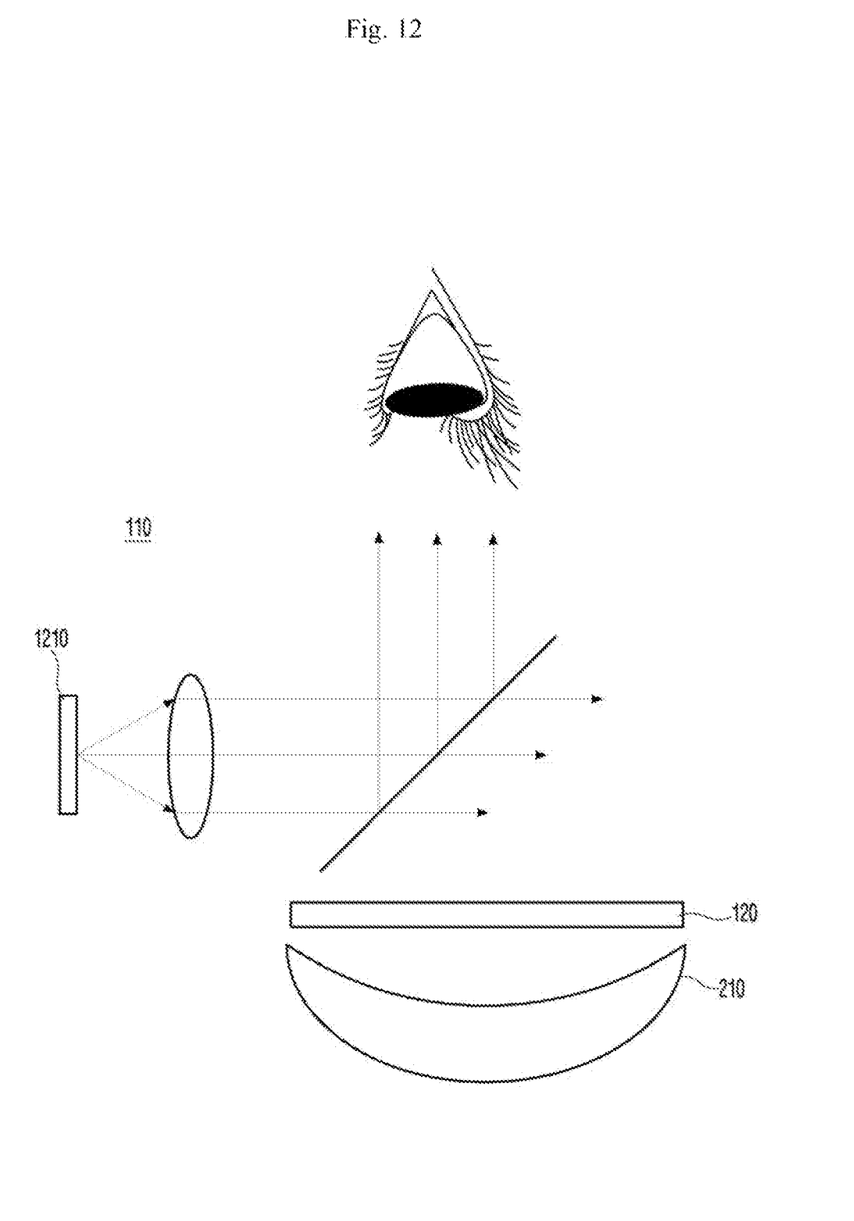

As shown in FIGS. 5, 10, and 12, the AR optical system 110 may provide the user with an AR video or image, which is output from an image output unit 510, 1010, or 1210 disposed on a side of the AR optical system 110, using a beam collimator 520, 1020, or 1220 and a mirror.

Figure 6:
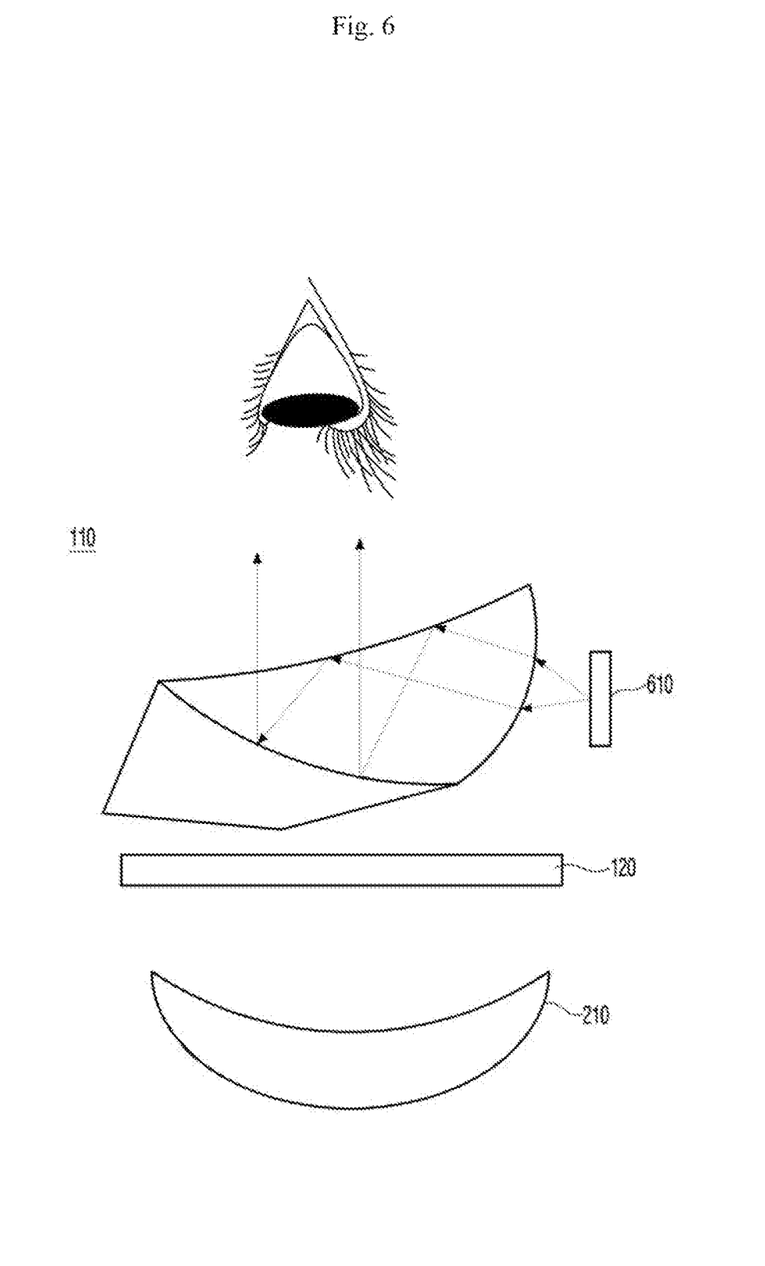

As shown in FIG. 6, the AR optical system 110 may provide the user with an AR video or image, which is output from an image output unit 610 disposed on a side of the AR optical system 110, using a beam splitter and a mirror.

As shown in FIGS. 7, 8, 9, and 11, the AR optical system 110 may provide the user with an AR video or image, which is output from an image output unit 710, 810, 910, or 1110 disposed on a side of the AR optical system 110, using a mirror alone.

Figure 7:
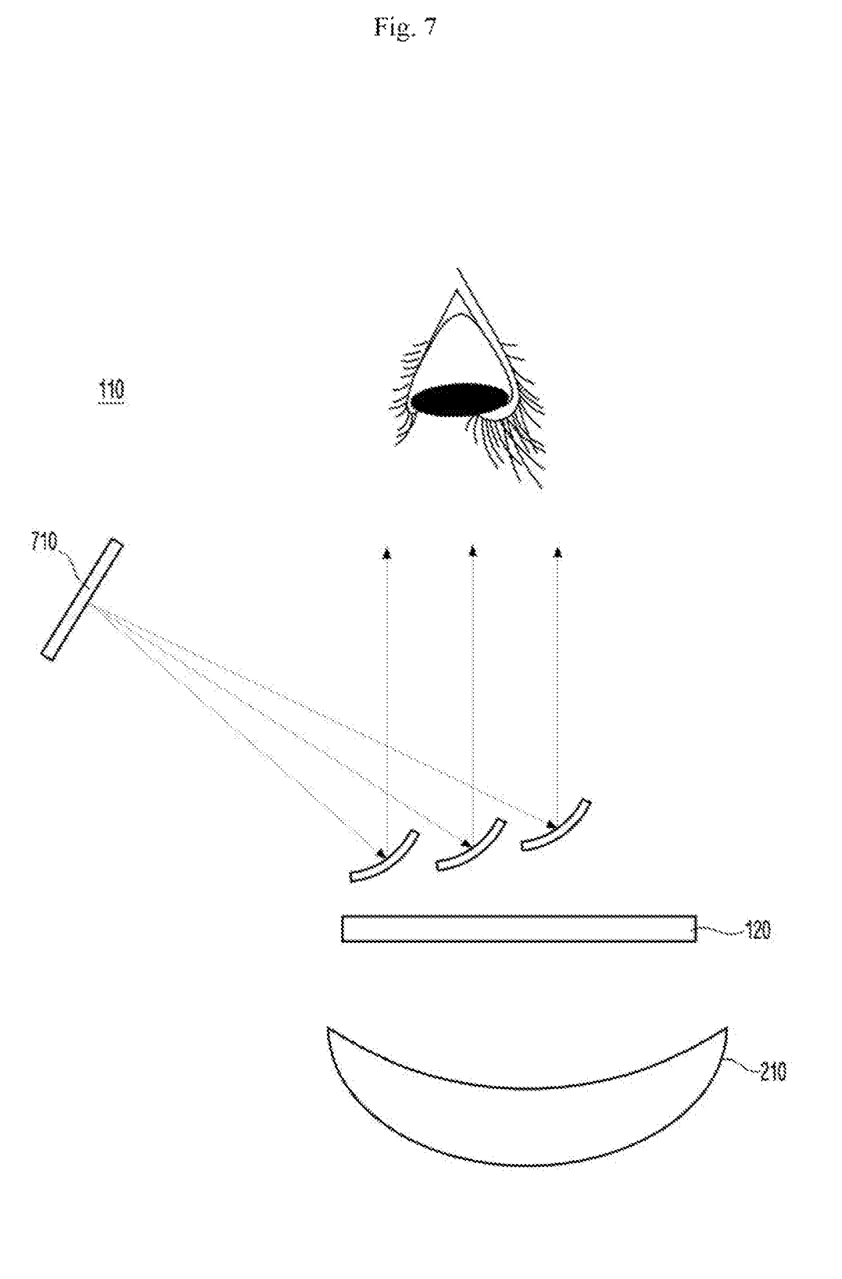
Figure 8:
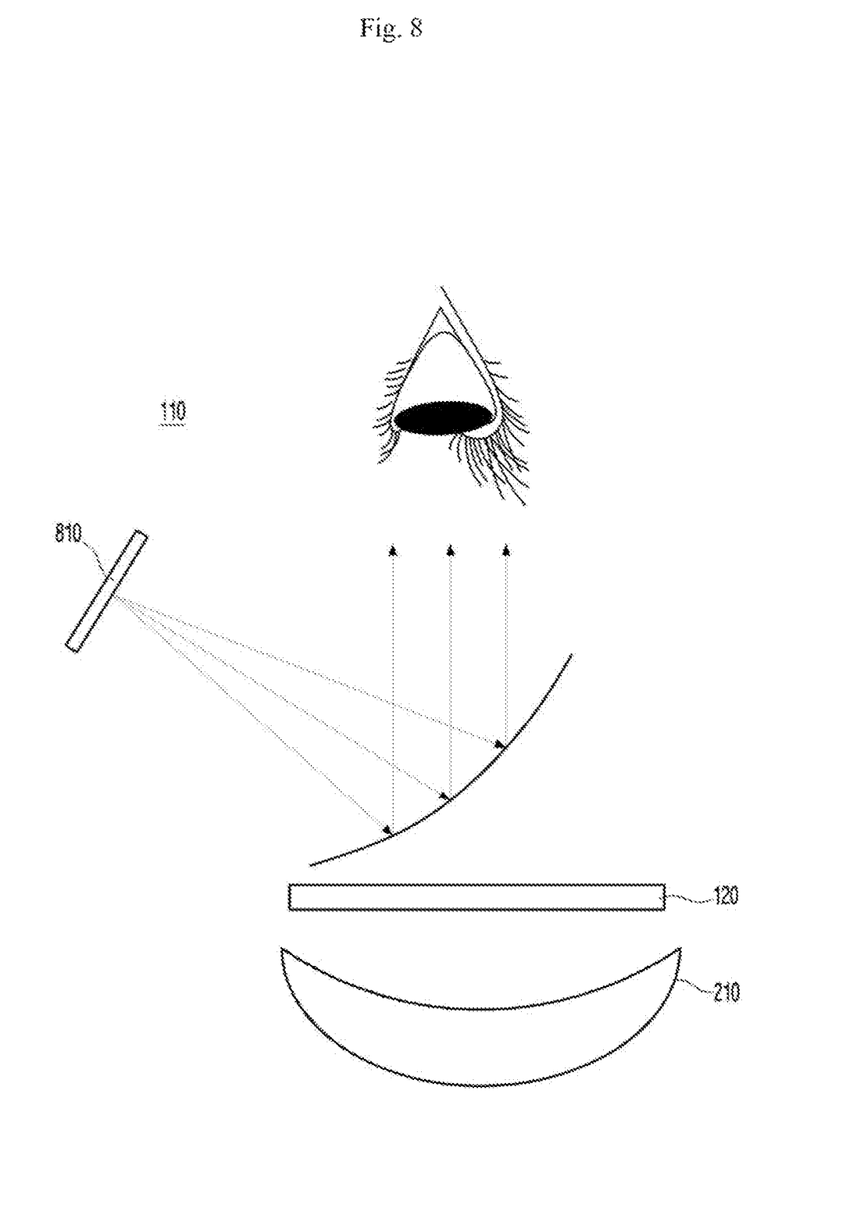
Figure 9:
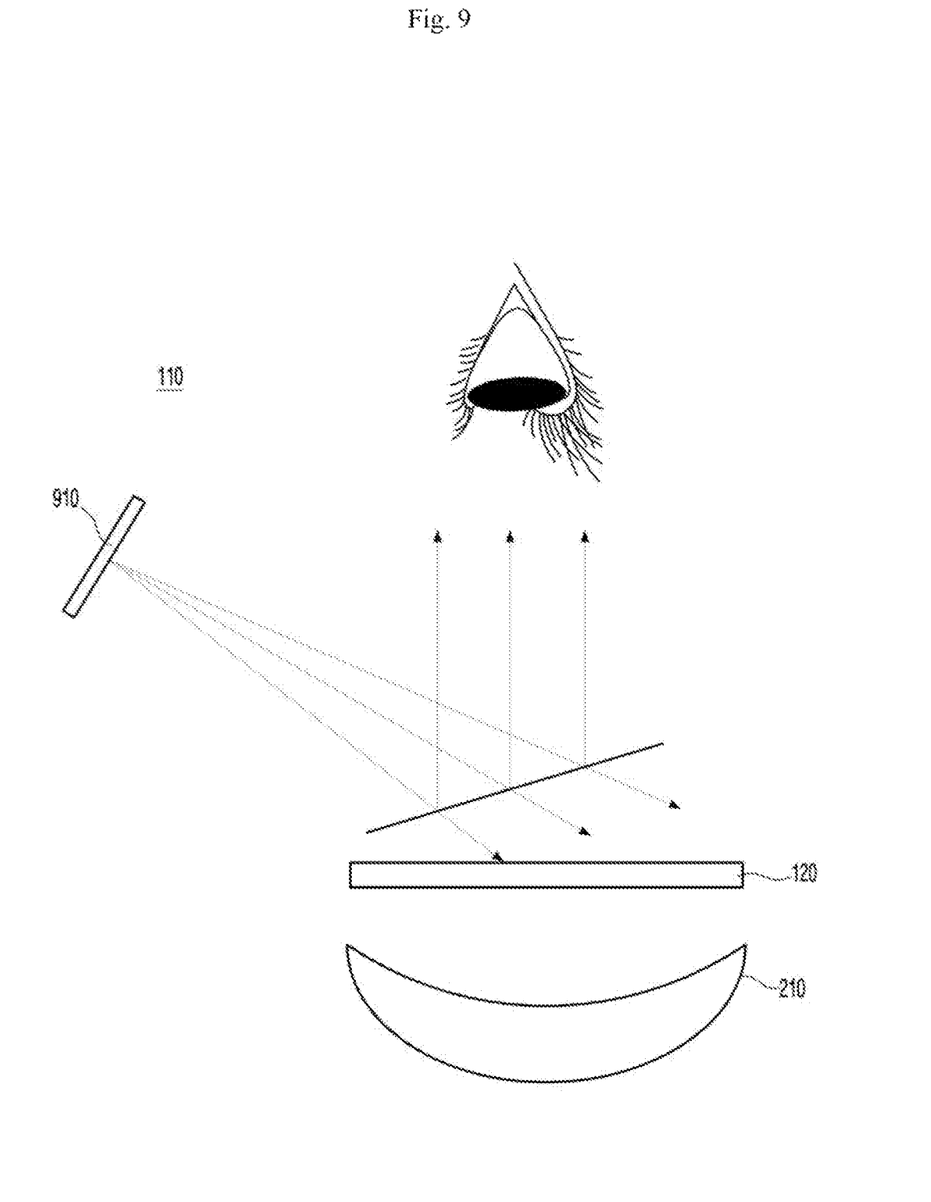

In each embodiment, the light attenuator 120 is disposed in the direction along which the actual environment image 210 of the AR optical system 110 is optically exposed, thereby providing the user with the optimal video or image viewing environment. To maximize spatial efficiency and light attenuation efficiency, the light attenuator 120 may have a similar shape to each optical element or device in the AR optical system 110. For example, where the AR optical system 110 includes an optical device or element which is of a straight line shape as shown in FIGS. 4, 5, and 9 to 12, the light attenuator 120 may also be formed in a straight line shape. Where the AR optical system 110 includes an optical device or element which is of a curved shape as shown in FIGS. 6 to 8, the light attenuator 120 may also be formed in a curved shape.

Figure 13:
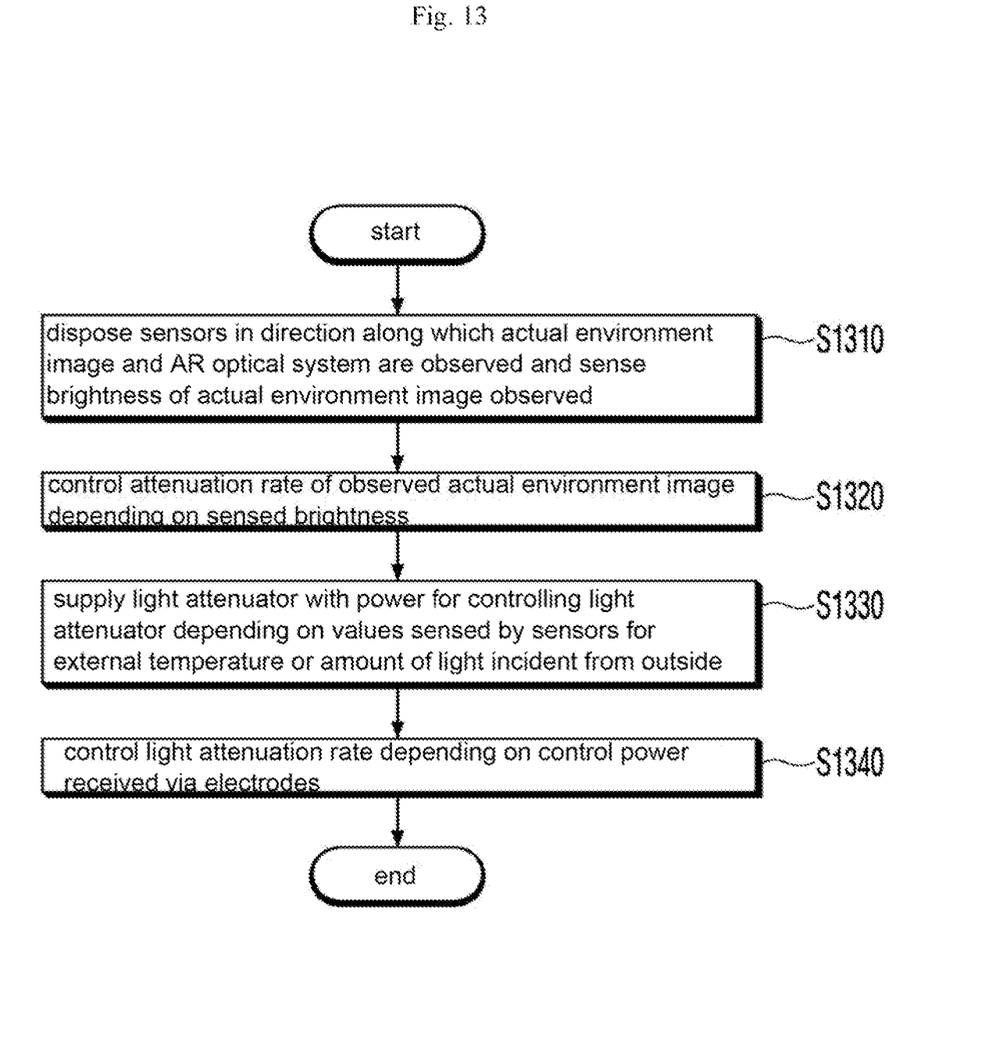
FIG. 13 is a flowchart illustrating a method of reactively attenuating light according to an embodiment of the disclosure.

FIG. 13 is a flowchart illustrating a method of reactively attenuating light according to an embodiment of the disclosure.

The sensors 130 and 135 (e.g., optical sensors) are disposed in the direction along which an actual environment image and an AR optical system are observed and senses the brightness of the actual environment image observed (S1310)

The controller 310 (e.g., a light controller) controls the attenuation rate of the observed actual environment image depending on the sensed brightness (S1320).

The controller 310 supplies, via the electrodes of the light attenuator 120, the light attenuator 120 with power for controlling the light attenuator 120 depending on values sensed by the sensors 130 and 135 for the external temperature or the amount of light incident from the outside (S1330).

The light attenuator 120 controls the light attenuation rate depending on the control power received via the electrodes (S1340).

Figure 14:
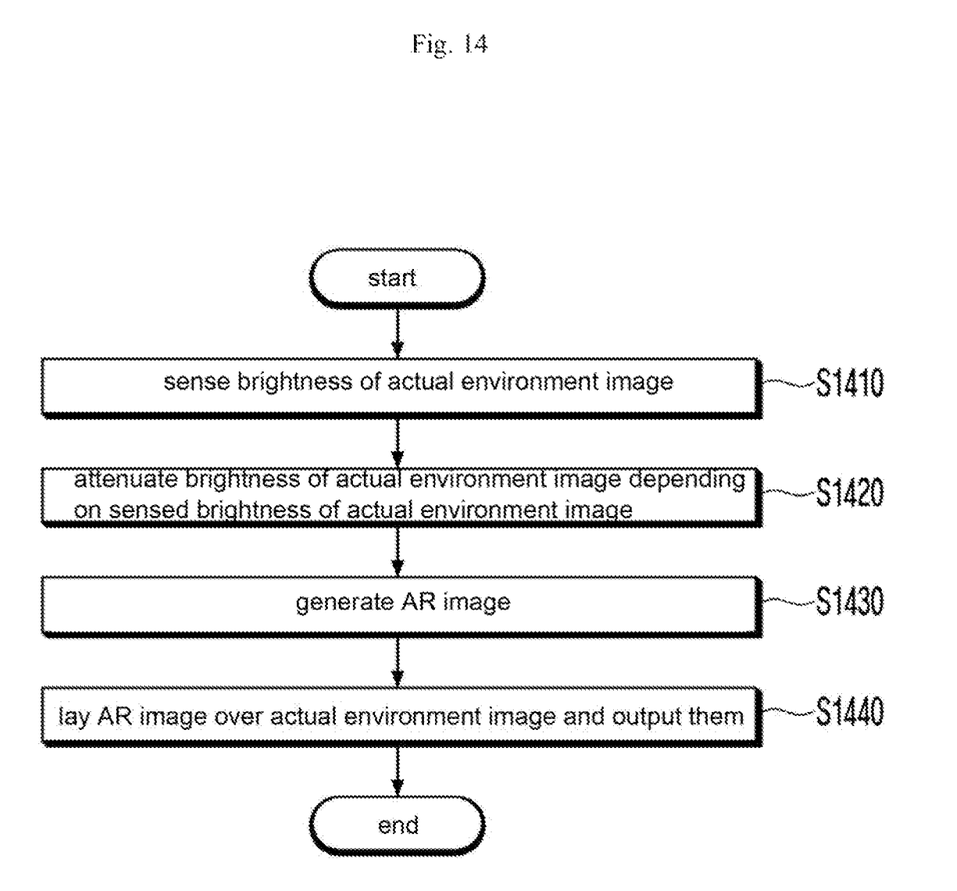
FIG. 14 is a flowchart illustrating a method of adjusting the brightness and outputting an AR image by an AR optical device according to an embodiment of the disclosure.

FIG. 14 is a flowchart illustrating a method of adjusting the brightness and outputting an AR image by an AR optical device according to an embodiment of the disclosure.

The light attenuator 120 senses the brightness of an actual environment image (or senses the brightness of a thing or object in the actual environment image) (S1410).

The light attenuator 120 attenuates the brightness of the actual environment image depending on the sensed brightness of the actual environment image (S1420).

The AR optical system 110 generates an AR image (S1430).

The AR optical system 110 lays the AR image over the actual environment image and outputs them (S1440).

Although FIGS. 13 and 14 illustrate that the steps are sequentially performed, this merely provides an embodiment of the disclosure. It would readily be appreciated by a skilled artisan that the steps of FIGS. 13 and 14 are not limited to the order shown but may rather be performed in a different order, one or more of the steps may simultaneously be performed, or other various modifications or changes may be made thereto without departing from the scope of the disclosure.

The steps or processes described above in connection with FIGS. 13 and 14 may be implemented as computer-readable code in a recording medium. The computer-readable recording medium includes all types of recording devices storing data readable by a computer system. The computer-readable recording medium includes a storage medium, such as a magnetic storage medium (e.g., a ROM, a floppy disk, or a hard disk) or an optical reading medium (e.g., a CD-ROM or a DVD). Further, the computer-readable recording medium may be distributed to computer systems connected via a network, and computer-readable codes may be stored and executed in a distributed manner.

The above-described embodiments are merely examples, and it will be appreciated by one of ordinary skill in the art various changes may be made thereto without departing from the scope of the disclosure. Accordingly, the embodiments set forth herein are provided for illustrative purposes, but not to limit the scope of the disclosure, and should be appreciated that the scope of the disclosure is not limited by the embodiments. The scope of the disclosure should be construed by the following claims, and all technical spirits within equivalents thereof should be interpreted to belong to the scope of the disclosure.

What is claimed is:

1. An augmented reality (AR) optical device, comprising:
an AR optical system configured to generate an AR image and lay the AR image over an actual environment image perceived by a user;
a light attenuator disposed in a direction along which the AR optical system is optically exposed to an actual environment and configured to attenuate a brightness of the actual environment image, the light attenuator including an electrode for receiving power;
a sensor sensing the brightness of the actual environment image; and
a controller receiving a sensing value corresponding to the sensed brightness from the sensor and controlling application of the power to the electrode according to the sensing value, wherein a rate of attenuating the brightness is varied depending on an amount of the power applied to the electrode.

2. The AR optical device of claim 1, wherein the light attenuator is an optical element configured to partially and selectively attenuate light.

3. The AR optical device of claim 2, wherein the light attenuator is formed of a guest-host liquid crystal.

4. The AR optical device of claim 1, wherein the light attenuator is configured to increase light attenuation when the brightness of the actual environment image increases.

* * * * *